United States Patent [19]

Wanderer

[11] Patent Number: 5,368,465
[45] Date of Patent: Nov. 29, 1994

[54] ICE-CREAM SCOOP WITH FOREARM APPENDAGE

[76] Inventor: Matthew J. Wanderer, 712 Pleasant St., Boulder, Colo. 80302

[21] Appl. No.: 29,140

[22] Filed: Mar. 10, 1993

[51] Int. Cl.[5] ............................................. A23G 9/28
[52] U.S. Cl. ................................. 425/187; 425/276; 425/279
[58] Field of Search ............... 425/276, 279, 187, 281; D7/681, 692, 648, 663; 30/345, 324, 327, 328

[56] References Cited

U.S. PATENT DOCUMENTS

| | | | |
|---|---|---|---|
| D. 162,435 | 2/1950 | Nugent | 425/276 |
| 309,437 | 12/1884 | Calef | 30/324 |
| 1,098,070 | 5/1914 | Whitney | D7/692 |
| 2,012,637 | 8/1935 | Ribley | D7/681 |
| 2,019,566 | 11/1935 | Gray | 425/276 |
| 2,077,501 | 4/1937 | Weiss | 425/281 |
| 2,210,623 | 8/1940 | Kelly | 425/277 |
| 2,256,770 | 9/1941 | Armstrong | 425/282 |
| 2,448,863 | 9/1948 | Costa | 425/285 |
| 2,576,388 | 11/1951 | Claflin | 30/327 |
| 2,976,257 | 3/1961 | Dawe et al. | 30/345 |
| 3,226,825 | 1/1966 | Molinaro | 30/327 |
| 3,358,619 | 12/1967 | Pareira | 30/324 |
| 3,761,120 | 9/1973 | Binkert | D7/692 |
| 4,392,806 | 7/1983 | Houle | 425/286 |
| 4,721,449 | 1/1988 | Alberts | 425/187 |
| 4,859,168 | 8/1989 | Calder | 425/286 |

*Primary Examiner*—Jay H. Woo
*Assistant Examiner*—Duane S. Smith
*Attorney, Agent, or Firm*—Greenlee and Winner

[57] ABSTRACT

The invention relates to an improved ice-cream scoop designed to alleviate strain on the operator's wrist, and to provide support and stability to the wrist. This improved scoop design significantly reduces the fatigue and discomfort associated with frequent and extended periods of use and lessens the potential for carpal tunnel syndrome. The scoop includes a hemispherical hollow bowl, handle, and forearm appendage connected to said bowl wherein said forearm appendage extends above the handle and conforms to the shape of an operator's forearm.

18 Claims, 4 Drawing Sheets

ICE-CREAM SCOOP WITH FOREARM APPENDAGE

FIELD OF THE INVENTION

The present invention relates generally to a manually-operated device for scooping and dispensing ice cream. More particularly, the invention concerns an improved ice-cream scoop designed to alleviate strain on the operator's wrist, reduce the fatigue and discomfort associated with frequent and extended periods of use, and lessen the potential for carpal tunnel syndrome. The scoop includes a hemispherical hollow bowl, handle and forearm appendage.

BACKGROUND OF THE INVENTION

Frozen edible substances, including ice cream, sherbet, sorbet, frozen yogurt and the like, are typically dispensed from bulk containers into dishes or cones. The ice cream or yogurt is scooped from the containers by means of traditional ice-cream scooping devices. Most such devices are simple in design, consisting of a hemispherical bowl attached to an elongated handle. "Improved" designs are more complex, featuring moveable or motorized parts. All existing designs, both simple and modified, tend to concentrate the entire force generated by the scooping action on the operator's wrist. None of these designs provide adequate support or stability for the user's wrist, nor do they provide a means for mitigating the strain caused by scooping. This strain and repetitive motion tends to fatigue the operator, especially after long time periods, and can have more serious medical consequences, including carpal tunnel syndrome. Carpal tunnel syndrome, caused by pressure on the median nerve, can have debilitating effects for the commercial operator, including sensory loss, atrophy, and weakness of the thumb. Cecil Textbook of Medicine (1992), J. Wyngaarden, L. Smith and J. Bennett eds. (W. B. Sanders Co.), p. 1563.

Certain prior art scoops purportedly reduce the friction between the scoop and frozen substance, but fail to obviate or relieve the aforementioned problems. Examples include U.S. Pat. No. Des. 305,852 (Clement et al.), disclosing a battery-heated ice-cream scoop, and U.S. Patent No. 5,000,672 (Halimi), disclosing a scoop with a heated forming edge. While these designs may facilitate slicing by partially melting or softening the ice cream, the pressure remains localized on the wrist. Neither device offers wrist support, stability, or relief from the strain caused by scooping. These mechanized devices are also impractical to operate and maintain, especially for the large volume retailer. Cords prove cumbersome and potentially dangerous, and batteries take time and resources to replace. Heated devices also raise the temperature of the ice cream, thereby altering the texture and flavor of the ice cream.

U.S. Pat. No. 4,758,150 (Fanini et al.) discloses an improved "semiautomatic" ice-cream scoop, the improvement comprising a motorized blade which slices and separates the ice cream from the scoop. Like other mechanized devices, however, this device requires an external energy source and is therefore impractical, particularly for the large volume retailer. Supply and return ducts are both cumbersome and potentially dangerous, blades need sharpening, and the motor requires maintenance.

Other "improved" scooping devices employ ejecting mechanisms which assist in releasing the ice cream from the scoop. Examples include U.S. Pat. No. 4,721,449 (Alberts), which discloses an ice cream scoop with a spring biased ejection mechanism, and U.S. Pat. No. 4,392,806 (Houle) which discloses a manually operated ejector mechanism, wherein the ejector comprises a moveable arcuate tongue with an attached lever arm. As with other prior art devices, however, these devices lack wrist support, stability, or relief from the strain caused by scooping.

Other major drawbacks of the mechanized scooping devices include the relatively high manufacturing costs, and the number of moving parts which must be cleaned and maintained. Moreover, while the handle and scoop are virtually indestructible, the moving parts are not. Metal fatigue and corrosion of the moving parts often requires that the entire device be discarded and replaced. The replacement costs, particularly for the large volume retailer, can be significant.

Despite the variety of designs currently available, a need remains for a practical, ergonomic and efficient ice-cream scoop. In particular, no scoop design to date includes a mechanism for diverting pressure away from the user's wrist, provides support or stability for the wrist, or in any way mitigates the strain caused by the repetitive scooping action. While mechanized devices assist in slicing and dispensing, they are impractical and expensive to operate, and lack a means for diverting pressure away from the user's wrist.

SUMMARY OF THE INVENTION

The present invention provides an improved ice-cream scoop designed to divert pressure away from the operator's wrist, and to provide support and stability for the wrist. This novel design significantly reduces the fatigue and discomfort associated with frequent or extended periods of use, and lessens the potential for carpal tunnel syndrome.

Another principal object of this invention is to provide an improved scoop for dispensing ice cream, which is practical and efficient in operation, and which lacks moving parts. The present invention provides a simple, solid piece device which can be easily and quickly cleaned.

Another object of this invention is to provide an improved scoop for dispensing ice-cream, which is of reliable operation, of relatively low manufacturing cost, and requires little or no maintenance.

A further object of this invention is to provide an improved ice-cream scoop which facilitates slicing and dispensing without the use of heat, which affects the texture and flavor of the ice cream.

Yet another object of this invention is to provide an attachable forearm appendage which can be mounted on existing ice-cream scoops as a means to divert pressure away from the operator's wrist, and to provide support and stability for the wrist.

A preferred embodiment of this invention provides an improved ice-cream scoop, comprising a hemispherical hollow bowl, forearm appendage, and handle, wherein said handle has a dimpled, pimpled or knurled surface and a knobbed end so as to ensure a secure grip.

Another preferred embodiment of this invention provides an improved ice-cream scoop, comprising a hemispherical hollow bowl, forearm appendage and handle, wherein said handle is reinforced with an internal brace and affixed to both ends of said forearm appendage so as to strengthen the forearm appendage.

Still another preferred embodiment of this invention provides an improved ice-cream scoop, comprising a hemispherical hollow bowl, handle and forearm appendage, wherein the scoop is coated with a non-stick resin or polymer.

A further embodiment of this invention provides an improved ice-cream scoop, comprising a hemispherical hollow bowl, handle and forearm appendage, wherein the forearm appendage has an adjustable connection with the scoop and handle.

Yet another embodiment of this invention provides an attachable forearm appendage, wherein the forearm appendage has a clamping means for affixing to existing ice-cream scoops.

The exact nature of this invention as well as other objects and advantages thereof will be readily apparent from consideration of the specification, including the drawings. Those of skill in the art will appreciate that the invention described herein is susceptible to many modifications and variations without departing from its scope as defined by the appended claims.

BRIEF DESCRIPTION OF THE DRAWINGS

The accompanying drawings illustrate a preferred embodiment of the invention, wherein.

DETAILED DESCRIPTION OF THE PREFERRED EMBODIMENTS

Figure 1:
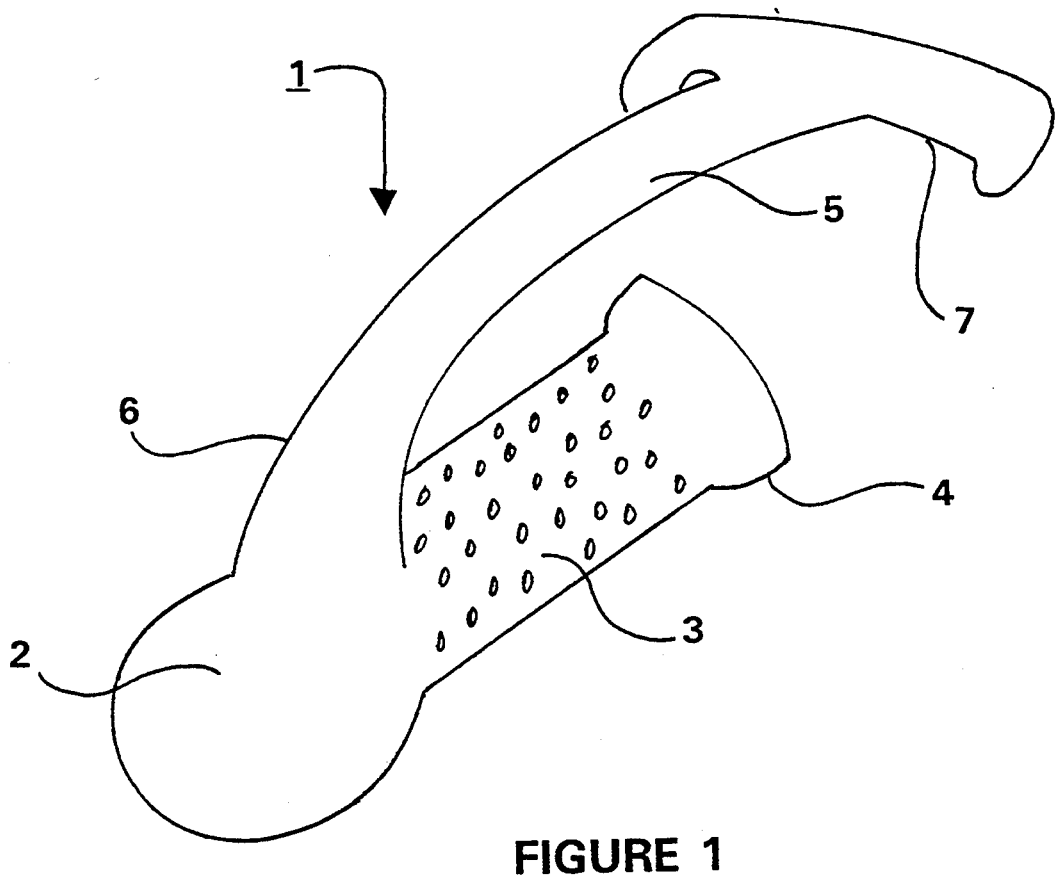
FIG. 1 shows a perspective view of the improved ice-cream scoop of the present invention.
Figure 2:
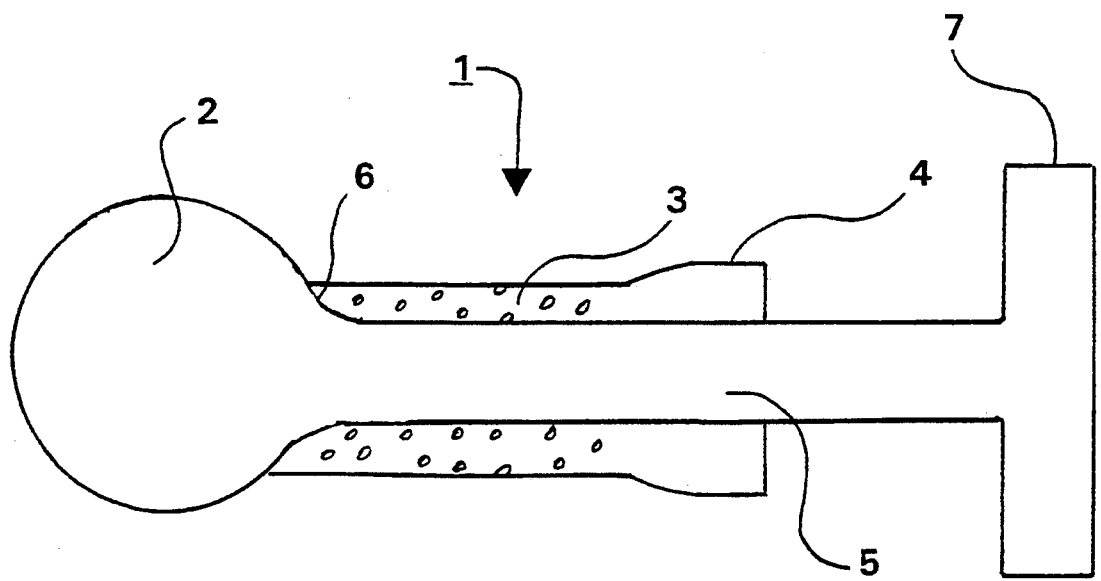
FIG. 2 shows a top view of the scoop body, including the handle and forearm appendage.
Figure 3:
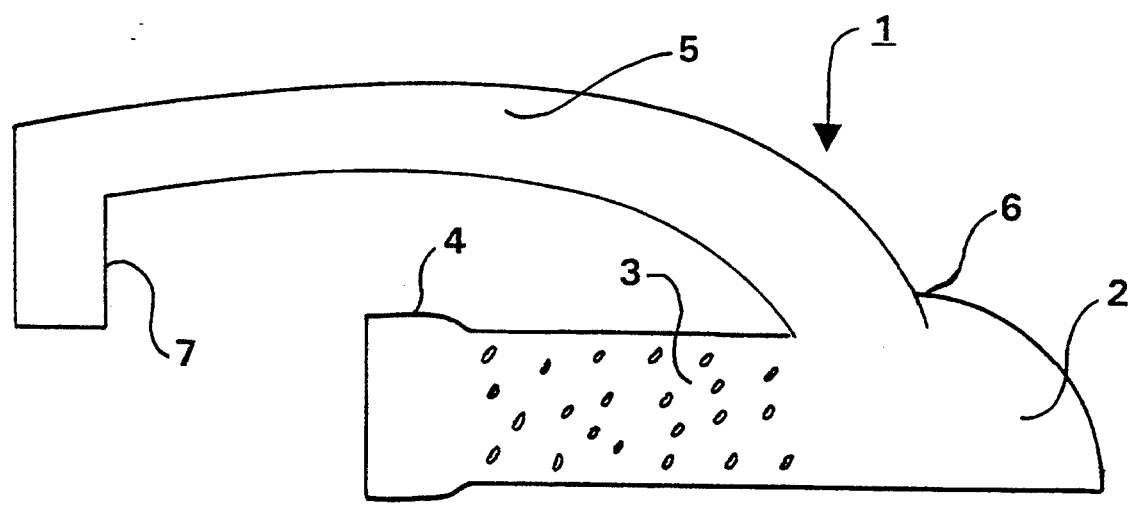
FIG. 3 shows a side view of the scoop body, including the handle and forearm appendage.

Referring to the drawings and particularly to FIGS. 1-3, the improved ice-cream scoop of the present invention 1 comprises a hemispherical hollow bowl 2 connected to one end of an elongated handle 3 and the first or proximal end of a forearm appendage 5, the purpose of which will presently be described.

To assist in the scooping of ice cream into the hollow interior of the bowl 2 and, more importantly, to serve as a mechanism for diverting pressure away from the user's wrist during scooping, is a forearm appendage 5 which is formed near the top of the bowl 2 above the handle 3. The forearm appendage functions as a lever means by transmitting force applied at the forearm directly to the bowl 2. This appendage also provides support and stability for the wrist, thereby mitigating the strain caused by the repetitive scooping action.

As used herein, "top" refers to portions of the scoop when the device of the invention is in a position such as is shown in FIGS. 1 and 3, open bowl 2 facing downward relative to the ice cream.

In the present form of the invention, the forearm appendage 5 comprises an elongated arm structure having a first or proximal end 6 connected to the top of the bowl 2 positioned above the handle 3. The forearm appendage 5 which, in the form of the invention shown in the drawings, comprises an elongated, slightly arcuate or bent arm, also includes a second or distal end portion designated by the numeral 7. Distal end portion 7 is transversely arcuate to conform to the rounded shape of the operator's forearm. It is apparent from the drawings that the forearm appendage 5 is longer than the handle 3, preferably extending one to five inches beyond the distal portion of said handle.

Also in the present form of the invention, the handle 3 comprises an elongated, generally cylindrical-shaped handle portion having a first or proximal end connected to the side of the bowl. The handle 3 which, in the form of the invention shown in the drawings, has a dimpled or pimpled surface, also includes a second or distal end portion designated by the numeral 4. Distal end portion 4 ends in a knob so as to prevent the operator's hand from slipping.

Figure 4:
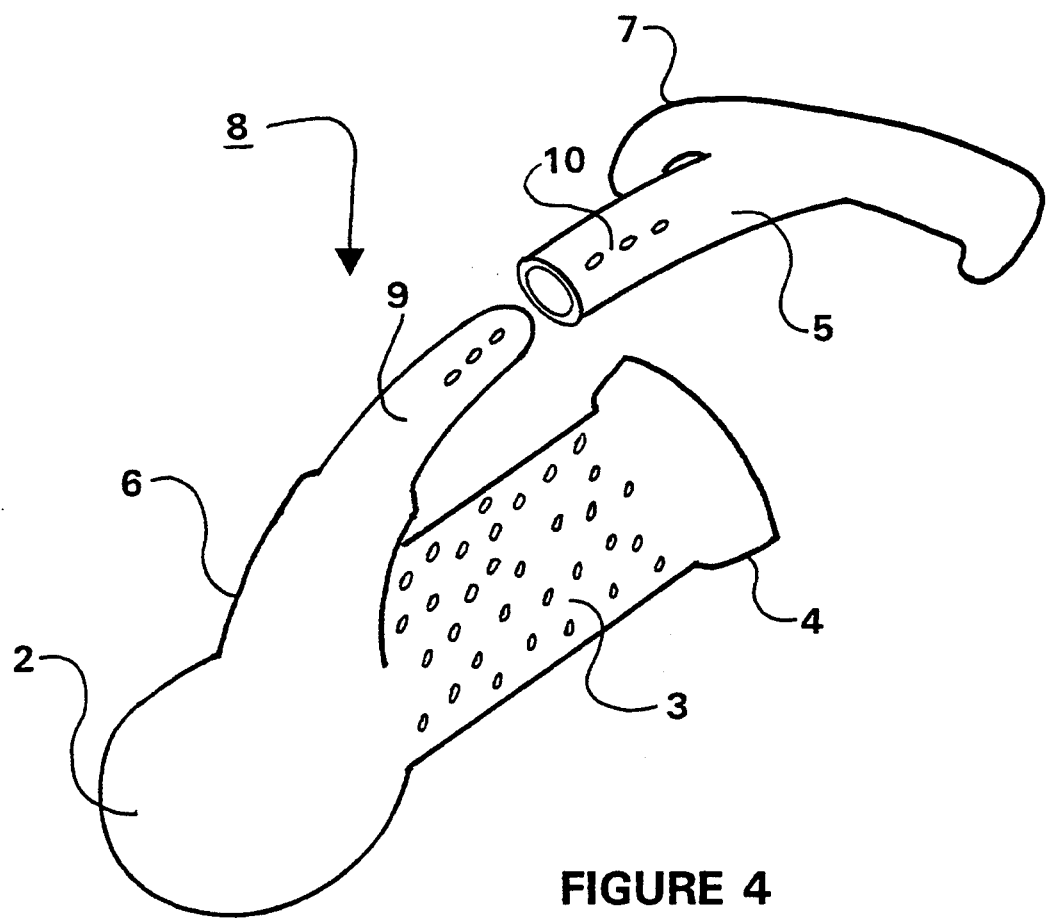
FIG. 4 shows a side view of an improved ice-cream scoop having an adjustable forearm appendage.
Figure 5:
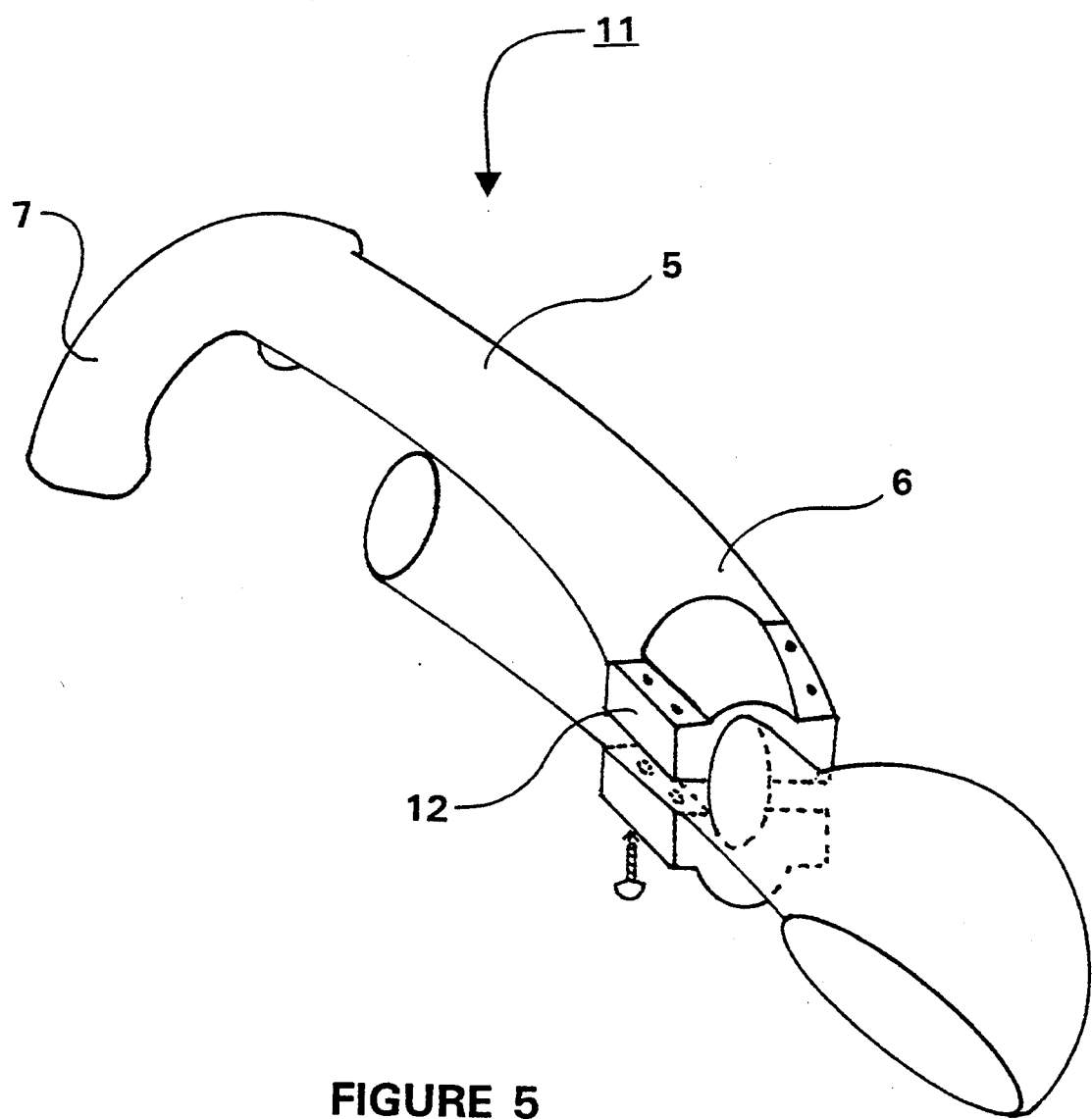
FIG. 5 shows a perspective view of an attachable forearm appendage.

A scoop 8 of FIG. 4 could be regarded as a modification of the scoop 1 shown in FIGS. 1-3. In the scoop 8 the connection between the bowl 2 and forearm appendage 5 comprises an adjusting means for extending and/or pivoting said forearm appendage relative to the bowl and handle in order to enable adjustment of the device to various arm sizes. The adjusting means, in the form of the invention shown in the drawing, has a flattened arm portion designated by the numeral 9 and a flattened tubular structure 10 to mate with the flattened arm 9. Both the flattened arm 9 and the flattened tubular structure 10 have holes for inserting pins, screws or other suitable fastening means. Said holes are positioned so as to accommodate various forearm lengths and to allow rotation of the second or distal end portion 7 relative to the first or proximal end 6 of the forearm appendage.

To improve the efficiency and ergonomic value of existing ice-cream scoops, there is an attachable forearm appendage 11 which functions in a manner comparable to the forearm appendage of the scoop 1 shown in FIGS. 1-3. Thus, the attachable forearm appendage, when affixed to an existing scoop, acts as a lever means by transmitting force applied at the operator's forearm directly to the hollow bowl portion of the existing scoop. In the present form of the invention, the attachable forearm appendage comprises an elongated arm structure having a first or proximal end 6 and a second or distal end portion designated by the numeral 7. First or proximal end 6 culminates in a clamping means 12 for affixing to the handle of an exiting scoop, preferably at the portion of the handle connected to the hollow bowl. The clamping means 12, in the form of the invention shown in the drawing, comprises two identical halves having holes on either side for the insertion of screws or other suitable fastening means.

Figure 6:
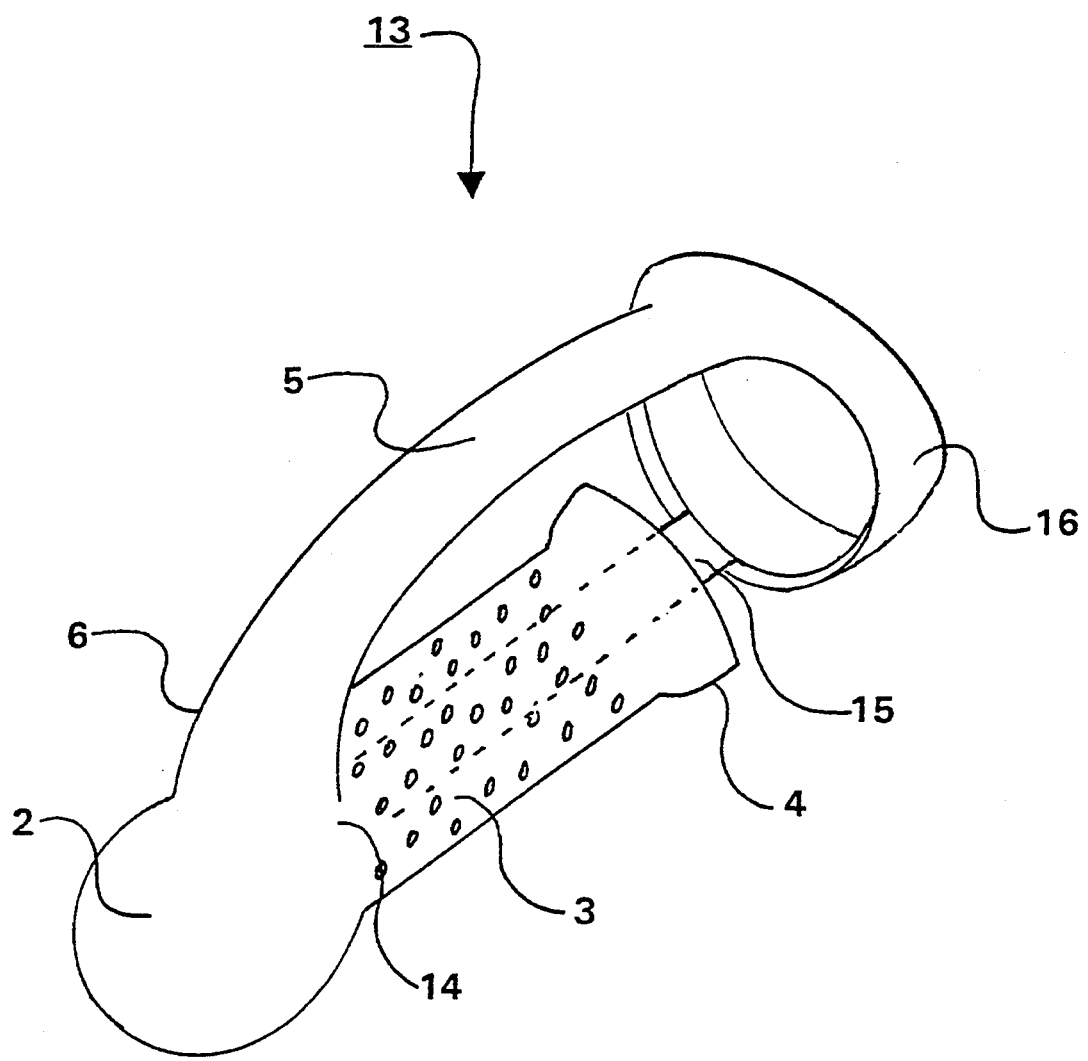
FIG. 6 shows a perspective view of an improved ice-cream scoop having a reinforced handle and forearm appendage.

A scoop 13 of FIG. 6 could be regarded as another modification of the scoop 1 shown in FIGS. 1-3. In scoop 13 the handle 3 comprises an internal brace 14 within a casing or outer surface portion. The internal brace 14, in the form of the invention shown in the drawing, comprises a first or proximal end connected to the side of the bowl and a second or distal end 15 which extends beyond the distal portion of the outer surface of the handle and connects with the closed cuff portion of the forearm appendage, designated by the numeral 16. Closed cuff portion 16, in the form of the invention shown in the drawing, is circular in design to conform to the rounded shape of the operator's forearm. The closed cuff portion 16 can be modified as appropriate, for example, to be transversely elliptical or to comprise an upper arcuate portion and a lower flattened portion.

The improved ice-cream scoop of this invention can be fabricated as one piece having the configuration shown in the figures, or as several pieces attached by suitable attachment means to form the depicted configuration.

Obviously, many modifications and variations of the present invention are possible and will be evident to those of ordinary skill in the art. For example, the improved ice-cream scoop is preferably constructed from a strong, durable metallic material; however, any suitable starting material or combination of materials can be used, including, for example, a variety of synthetic plastics widely available in commerce. While the embodiment shown in the drawings hereof comprises a transversely oblong, slightly arcuate or bent forearm appendage, said appendage can also be straight, or transversely flat or cylindrical. Moreover, while the exemplified embodiments comprise forearm appendages positioned directly above and parallel to the handle, said appendage can be positioned to one side of, or at an angle with, the handle. Further, although the exemplified handle surface is dimpled or pimpled, the present invention contemplates all surface textures, including knurled, corrugated, notched, serrated, grooved and smooth. Finally, while the distal end portion of the forearm appendage 7 shown in the drawings is a circular or transversely arcuate structure designed to conform to the shape of the operator's forearm, said distal end portion can be any suitable structure capable of embracing the operator's forearm, including ties, buckles, clamps and other bracing means.

It is therefore to be understood that within the scope of the appended claims, the invention may be practiced in ways other than as specifically described herein.

I claim:

1. An ice-cream scoop comprising a generally hemispherical hollow bowl, a handle having one end portion connected to said bowl, and a forearm appendage having a proximal end portion connected to said bowl, wherein said forearm appendage further comprises an elongated arm positioned above the handle and a distal end portion, said distal end portion generally conforming to the shape of an operator's forearm.

2. An ice-cream scoop according to claim 1, wherein the surface of said handle is dimpled, pimpled or knurled.

3. An ice-cream scoop according to claim 1, wherein the surface of said handle is corrugated or serrated.

4. An ice-cream scoop according to claim 1, wherein the surface of said handle is notched or grooved.

5. An ice-cream scoop according to claim 1, wherein said handle further comprises an elongated handle portion and a second end portion, said second end portion being enlarged relative to said elongated handle portion in order to prevent slippage.

6. An ice-cream scoop according to claim 1, wherein said handle further comprises an elongated handle portion having a pimpled or knurled surface and a second end portion, said second end portion being enlarged relative to said elongated handle portion in order to prevent slippage.

7. An ice-cream scoop according to claim 1, wherein said elongated forearm appendage is slightly arcuate or bent.

8. An ice-cream scoop according to claim 1, wherein said forearm appendage extends beyond the distal end portion of said handle.

9. An ice-cream scoop according to claim 8, wherein said forearm appendage extends one to five inches beyond the distal end portion of said handle.

10. An ice-cream scoop according to claim 1, wherein said hemispherical hollow bowl, handle and forearm appendage are fabricated as a unit.

11. An ice-cream scoop according to claim 1, wherein said hemispherical hollow bowl, handle and forearm appendage are fabricated as individual units and attached to one another by suitable attachment means.

12. An ice-cream scoop according to claim 1, wherein said hemispherical hollow bowl is coated with a nonstick resin or polymer.

13. An ice-cream scoop according to claim 1, wherein said forearm appendage has an adjustable connection with said bowl and said handle.

14. An ice cream scoop according to claim 13, wherein said adjustable connection comprises a first flattened arm portion and a second flattened tubular portion, said second tubular portion being slidably and rotatably positioned relative to said first arm portion.

15. An ice-cream scoop according to claim 1, wherein said handle further comprises an internal brace structure and an outer casing, said internal brace structure extending beyond said outer casing and connecting to the second end portion of the forearm appendage.

16. An ice-cream scoop according to claim 15, wherein said second end portion of the forearm appendage is transversely circular or elliptical.

17. An ice-cream scoop comprising a generally hemispherical hollow bowl, a handle having a first end portion connected to said bowl, and a forearm appendage having a proximal end portion removably connected to said first end portion of said handle, wherein said forearm appendage is positioned above said handle, and wherein said forearm appendage further comprises an elongated arm and a distal end portion, said distal end portion generally conforming to the shape of an operator's forearm.

18. An ice-cream scoop according to claim 17, wherein said removable connection is a clamping means.

* * * * *